(12) United States Patent
Jacob et al.

(10) Patent No.: US 6,690,489 B1
(45) Date of Patent: Feb. 10, 2004

(54) COLOR CONVERSION ACCELERATION USING LOOKUP TABLES

(75) Inventors: Steve A. Jacob, Boise, ID (US); David A. Keefer, Boise, ID (US); Michael Stokes, Bellevue, WA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/454,245

(22) Filed: Dec. 2, 1999

(51) Int. Cl.[7] .............................. G06K 15/00; H04N 1/46
(52) U.S. Cl. ........................ 358/1.9; 358/3.23; 358/518
(58) Field of Search ........................ 358/1.2, 2.1, 3.23, 358/1.9, 500, 518, 523, 530

(56) References Cited

U.S. PATENT DOCUMENTS

| | | | |
|---|---|---|---|
| 5,087,126 A | 2/1992 | Pochieh ..................... 356/402 |
| 5,243,414 A | 9/1993 | Dalrymple et al. ......... 358/500 |
| 5,293,228 A | 3/1994 | Marti ......................... 348/391 |
| 5,528,386 A | 6/1996 | Rolleston et al. ........... 358/522 |
| 5,539,540 A * | 7/1996 | Spaulding .................. 358/518 |
| 5,583,666 A * | 12/1996 | Ellson ....................... 358/518 |
| 5,787,193 A | 7/1998 | Balasubramanian ........ 382/167 |
| 5,818,960 A | 10/1998 | Gregory, Jr. et al. ....... 382/167 |
| 5,822,503 A * | 10/1998 | Gass .......................... 395/109 |
| 5,838,333 A | 11/1998 | Matsuo ...................... 345/431 |
| 6,031,628 A * | 2/2000 | Jacob ......................... 358/1.9 |
| 6,456,395 B1 * | 9/2002 | Ringness ................... 358/1.9 |

FOREIGN PATENT DOCUMENTS

WO    WO 92/06557    4/1992    ............ H04N/1/46

* cited by examiner

Primary Examiner—Jerome Grant, II

(57) ABSTRACT

A graphics language interpreter includes one or more color converters that accept input color values and that algorithmically convert such input color values to output color values. The color converters are specified by a standard that defines the predefined graphics language. The color converters use color conversion algorithms that are potentially specified by graphics commands during rendering. A lookup component is associated with the color converters. The lookup component indicates output color values corresponding respectively to selected input color values. The lookup component is initialized with output color values that are converted from the selected input color values by the converters. During rendering, the graphics language interpreter uses the lookup component rather than the one or more color converters to convert input color values to output color values.

28 Claims, 5 Drawing Sheets

COLOR CONVERSION ACCELERATION USING LOOKUP TABLES

TECHNICAL FIELD

This invention relates to printers that are compatible with PostScript language programming, and to PostScript graphics language interpreters that are used within such printers.

BACKGROUND

The PostScript graphics language is a simple interpretive programming language with powerful graphics capabilities. Its primary application is to describe the appearance of text, graphical shapes, and sampled images on printed or displayed pages. A program in this language can communicate a description of a document from a composition system to a printing system or control the appearance of text and graphics on a display. The description is high level and device independent.

PostScript is a trademark of Adobe Systems Incorporated. However, the PostScript trademark is used in conjunction with a widely used and well-defined standard. Adobe Systems has authored a book entitled *PostScript Language Reference Manual: Second Edition,* published by Addison Wesley, 1990, which sets forth the current PostScript language standard. This book is hereby incorporated by reference. Although standards such as the Postscript language standard tend to evolve new features, Adobe Systems has endeavored to limit such evolution to well-publicized "levels," and to ensure that new levels are upwardly compatible with previous levels.

The PostScript language includes powerful facilities for describing the colors of graphical objects to be marked on the current page. The color facilities are divided into two parts:

Color specification. A PostScript language program can specify abstract colors in a device independent way. Colors can be described in any of a variety of color systems or color spaces. Some color spaces are related to a device color representation (gray scale, RGB, and CMYK); others are related to human visual perception (CIE-based). Certain special features are also modeled as color spaces: patterns, separations, and indexed color mapping.

Color rendering. The PostScript interpreter reproduces colors on a raster output device by a multi-step process that includes color conversions, gamma correction, halftoning, and scan conversion. Certain aspects of this process are under PostScript language control. However, unlike the facilities for color specification, the color rendering facilities are device dependent and ordinarily should not be modified by a PostScript program.

Colors are specified as values having one or more color components. A color component is usually a number. For example, a gray value can be specified by a single number, ranging from 0.0 (black) to 1.0 (white). A full color can be specified in any of several ways. A common method uses three numbers to specify red, green, and blue components.

Color values are interpreted according to the current color space. There are three categories of color spaces:

Device color spaces collectively refer to several methods for directly specifying colors or gray levels that the output device is to produce. These methods include RGB (red-green-blue), HSB (hue-saturation-brightness), and CMYK (cyan-magenta-yellow-black).

CIE (the Commission Internationale de l'Eclairage) has created an international standard for color specification. Colors can be specified in the CIE-based color spaces in a way that is independent of the characteristics of any particular output device. One CIE color space uses parameters designated as X, Y, and Z.

Special color spaces add special semantics to an underlying color space. They include facilities for patterns, indexed color mapping, and separations. Since the invention does not involve special color spaces, they will not be included in the following discussions and will not be shown in the accompanying drawings.

Color spaces, including specific examples of the color spaces implemented in the current PostScript standard, are explained in more detail in the *PostScript Language Reference Manual* cited above. Generally, the device color spaces enable the specification of color values that are directly related to their representation on an output device. The color values map directly—or via simple conversions—to the application of device colorants such as quantities of ink or intensities of display phosphors. CIE-based color spaces, on the other hand, allow the specification of color values that are related to human visual perception. The goal of the CIE standard is for a given CIE-based color specification to produce consistent results on different output devices, up to the limitations of each device.

For clarify in the following discussion, device color spaces and color values specified in device color spaces are referred to as device-dependent color spaces and device-dependent color specifications. CIE-based color spaces and color values specified in CIE-based color spaces are referred to as device-independent color spaces and device-independent color specifications, respectively.

FIG. 1 shows major PostScript language features or operations, implemented by a software-based PostScript interpreter, for rendering color. The organization of FIG. 1 is defined by the PostScript standard, and is published in the *PostScript Language Reference Manual* (referenced above). Although the representation of FIG. 1 is somewhat simplified, it shows the standardized components that are relevant to the invention.

Colors can be specified in device-dependent or device-independent color spaces. A color specified in a device-dependent color space is referred to in FIG. 1 as a device-dependent color specification. A color specified in a device-independent color space is referred to in FIG. 1 as a device-independent color specification.

Device-dependent color specifications are processed first by a color conversion function 20. A PostScript language program can contain commands that request explicit conversions between device-dependent color spaces. Any such requested conversions are performed by color conversion function 20.

The interpreter then maps the device color values through transfer functions 21—one transfer function per color component. The transfer functions compensate for peculiarities of the output device, such as non-linear gray-level response. This step is sometimes called gamma correction.

If the output device cannot reproduce continuous tones, but only certain discrete colors, such as black and white pixels, the interpreter invokes a halftone function 22, which approximates the desired colors by means of patterns of pixels.

Finally, the interpreter performs scan conversion (not shown) to paint the appropriate pixels of the raster output device with the requested colors.

Device-independent color specifications are processed first by a CIE conversion function 23, also referred to as a color space array (CSA), and then by a color rendering dictionary (CRD) 24. The CIE conversion function 23 converts device-independent color specifications to a base device-independent color space that uses components referred to as X, Y, and Z. Color rendering dictionary 24, in turn, transforms the device-independent color specifications into device-dependent color specifications. Specifically, the color rendering dictionary converts the device-independent color specifications to a native device-dependent color space—taking into account the known properties of the output device. The goal of this process is to produce actual visual output that accurately reproduces the requested device-independent color values as perceived by a human observer on the final rendering medium.

The color rendering dictionary is a standardized component of a PostScript language interpreter. However, its specific parameters are device dependent and are determined during a calibration process that is not specified by the PostScript standard. The color rendering dictionary can be configured to reference a three-dimensional lookup table to find device-dependent values corresponding to specified device-independent values.

The configuration shown in FIG. 1 is implemented in what is referred to as "Level 2" of the PostScript language standard. The previous version of the standard, referred to as "Level 1," did not include the concept of device independent color spaces. Accordingly, it did not include components 23 and 24 of FIG. 1, which relate to converting device-independent color specifications to device-dependent color specifications. Because of the differences between Level 1 and Level 2 of the PostScript language standard, the color processing path for device-dependent color specifications is referred to as the "Level 1 color pipeline." The color processing path for device-independent color specifications is referred to as the "Level 2 color pipeline."

The PostScript architecture described above provides a great degree of flexibility through its various color conversion components: color space array 23, color rendering dictionary 24, color conversion function 20, transfer functions 21, and halftone function 22. However, this flexibility comes at the price of speed. As specified in the PostScript standard, the components are implemented in software—by a language interpreter. This tends to be very slow. As an example, the standardized color rendering dictionary must be implemented in a very inefficient way due to the constraints imposed by the PostScript standard.

More specifically, the PostScript standard allows PostScript programs to dynamically specify and configure these color conversion components. For example, the CRD can be dynamically configured by use of the "setcolorrendering" operator. To provide such configurability, the color rendering dictionary uses bulky and inefficient data structures, containing large amounts of ASCII data. It is difficult or impossible to enhance the efficiency of these data structures without sacrificing compatibility with the PostScript standard. These comments apply generally to the various color conversion components of the PostScript architecture.

Furthermore, the color conversion components typically implement extensive mathematical and/or algorithmic operations on input values in order to find corresponding output values. These operations include range checking, encoding, decoding, interpolations, and matrix transformations. Such operations become very slow when implemented in an interpreted language.

One way to increase the speed of these components would be to implement them in hardware rather than software. However, this has been difficult to accomplish because the algorithms and transformations performed by the conversion components can by dynamically specified, during color rendering, by graphics language commands. Although default algorithms and transformations are typically provided, print jobs can specify replacement algorithms and transformations at any time, making hardware-based conversion components useless. Thus, it has been previously thought that hardware-based solutions would not provide compatibility with the PostScript standard.

Indeed, absolute compatibility with the PostScript standard is a very important requirement. One reason for the popularity of the PostScript language is that any PostScript program can be executed by any PostScript-compatible rendering device, and will result in nearly identical results. Printer manufacturers, as a result, have been very hesitant to alter the structure of the color rendering paths in any way.

Nevertheless, the prior art methods of implementing dynamically-changeable color conversion components are significantly slower than they should be. The inventors have found a way to remedy this shortcoming of the prior art.

SUMMARY

In accordance with one aspect of the invention, one or more color conversion components are associated with a lookup table. The lookup table is initialized with data calculated by the color conversion components. During actual rendering, color conversions are accomplished with the lookup table rather than the color conversion components. When new transforms are specified by graphics commands, the lookup table is reinitialized by the newly configured color conversion components before performing further rendering. A cache is preferably implemented to store lookup tables corresponding to different color transforms and transformation algorithms.

In accordance to another aspect of the invention, each lookup table contains only a limited number of transformations, and additional transformations are obtained by interpolation. Such interpolation is preferably performed by hardware designed specifically for this purpose, rather than by instruction-based logic.

Various configurations of lookup components to PostScript color conversion components are possible. In the described embodiment, both the color space array and the color rendering dictionary are associated with a single lookup table, while another lookup table is used to perform the conversion and transformation functions of the PostScript level 1 pipeline. Conversion components of ICC profile-based systems can also be associated with such lookup tables.

DETAILED DESCRIPTION

Figure 2:
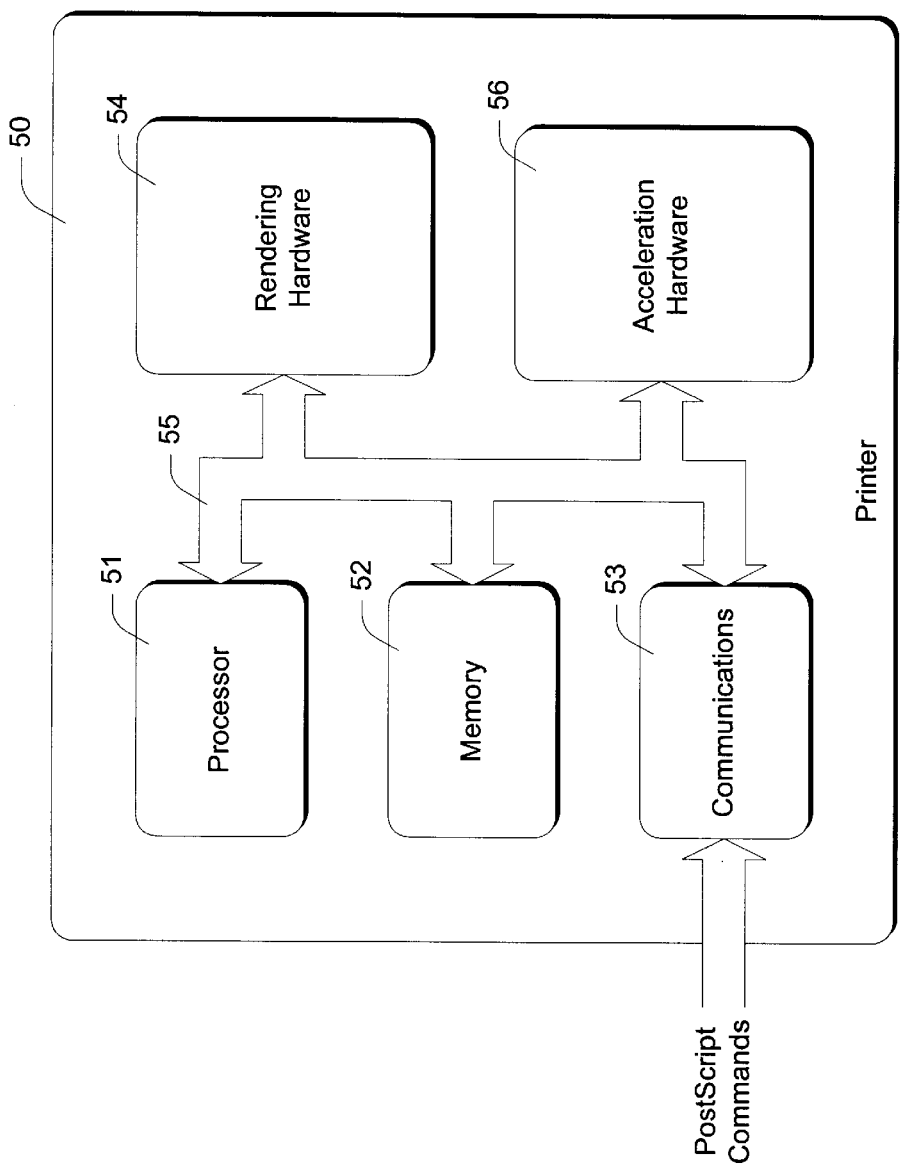
FIG. 2 is a simplified block diagram of a PostScript-compatible printer in accordance with an embodiment of the invention.

FIG. 2 shows pertinent components of a PostScript-compatible printer 50 in accordance with the invention. As used herein, the term PostScript-compatible means that the printer complies with PostScript specifications and standards published by Adobe Systems or standards bodies. A PostScript-compatible printer accepts valid PostScript programs and commands, and yields graphical output as specified by PostScript standards.

Printer 50 has a microprocessor 51 and associated memory 52. Memory 52 contains processor instructions that are executable by microprocessor 51 to perform desired steps and operations. In the described embodiment of the invention, such programmed steps and operations implement a PostScript-compatible interpreter including color rendering paths as described below. Standard programming techniques are used to compile instructions and programs that are sequentially executed by microprocessor 51 to carry out the functions of the interpreter. The microprocessor, memory, and instructions that implement the PostScript interpreter are commonly referred to as firmware. Firmware is instruction-based logic that performs functions by retrieving instructions from memory and executing such instructions. The term "instructionless logic" will be used below to indicate logic and logic functions that are performed without such instructions, preferably by hardware logic.

Printer 50 also includes communications means 53 for receiving PostScript commands and programs from an external source such as a computer. Communications means 53 is typically a conventional parallel, serial, or network communications port. In many cases, bidirectional communications will be provided.

Printer 50 also includes rendering hardware 54. The specific nature of the rendering hardware depends on the exact nature of the printing process utilized by the printer. In the described embodiment of the invention, the printer utilizes color laser printing technology. The rendering hardware includes appropriate electrical and communications interfaces so that processor 51 can control the printing process. Communication between the various components of the printer is represented by a communications bus 55, although actual implementation might require different forms of interfaces between different components.

In addition to conventional components described above, printer 50 includes conversion acceleration hardware 56. Such hardware communicates with microprocessor 51 through communications bus 55. The basic function of hardware 56 is to implement and provide data from lookup tables as will be described below.

Figure 3:
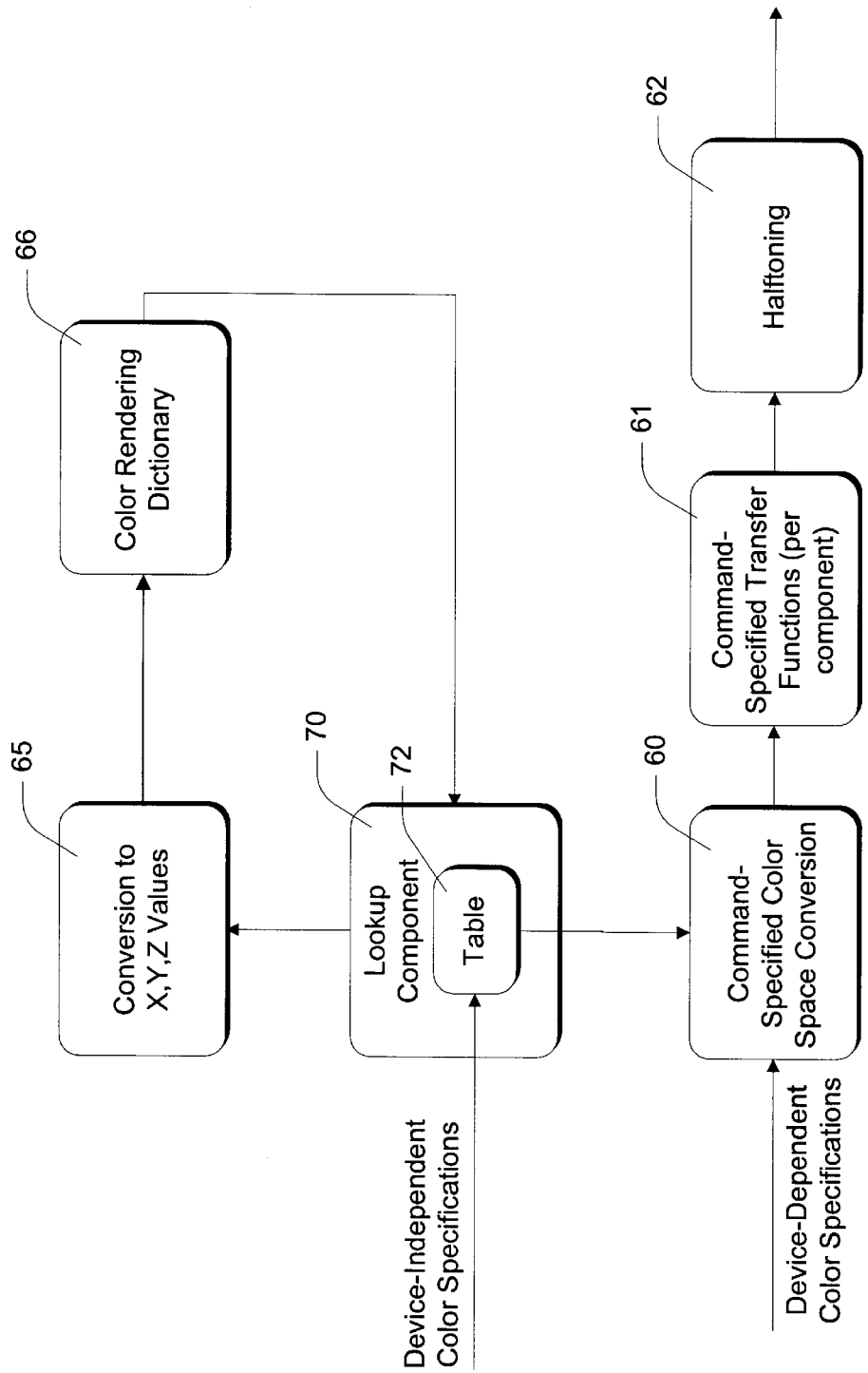
FIG. 3 is a block diagram of color rendering paths in a PostScript language interpreter in accordance with an embodiment of the invention.

FIG. 3 shows a PostScript pipeline architecture in accordance with an exemplary embodiment of the invention. The illustrated color rendering paths are formed within the PostScript language interpreter, which is in turn implemented by processor 51 in conjunction with memory 52, the programs contained in memory 52, and acceleration hardware 56.

As those familiar with this technology will realize, the color rendering paths shown in FIG. 3 represent only a small portion of the functions and responsibilities of an actual PostScript interpreter. However, FIG. 3 illustrates the interpreter functions with which the present invention is concerned, relating to the conversion of command-specified color specifications to internal working color specifications.

The standardized PostScript graphics language interpreter implemented by printer 50 accepts both device-dependent and device-independent color specifications, in accordance with conventional PostScript Level 2 interpreter specifications. The nature of these different types of color specifications is described above, in the "Background" section of this document.

The function of the color rendering paths is to convert device-dependent and device-independent color specifications into internal working color specifications. The internal working color specifications are relative to an internal working color space that is specific to the actual rendering hardware of printer 50. Although the various blocks of FIG. 3 might imply discrete components for performing different functions, such blocks actually indicate different operations performed by the printer firmware, except for block 70 which indicates a function performed by acceleration hardware 56 in conjunction with the printer firmware.

The color conversion method illustrated by FIG. 3 includes two color rendering pipelines, corresponding to conventional PostScript Level 1 and Level 2 color rendering pipelines. The Level 1 pipeline accepts device-dependent color specifications, while the Level 2 pipeline accepts device-independent color specifications. Each pipeline is fully compatible with conventional PostScript color specifications.

Figure 1:
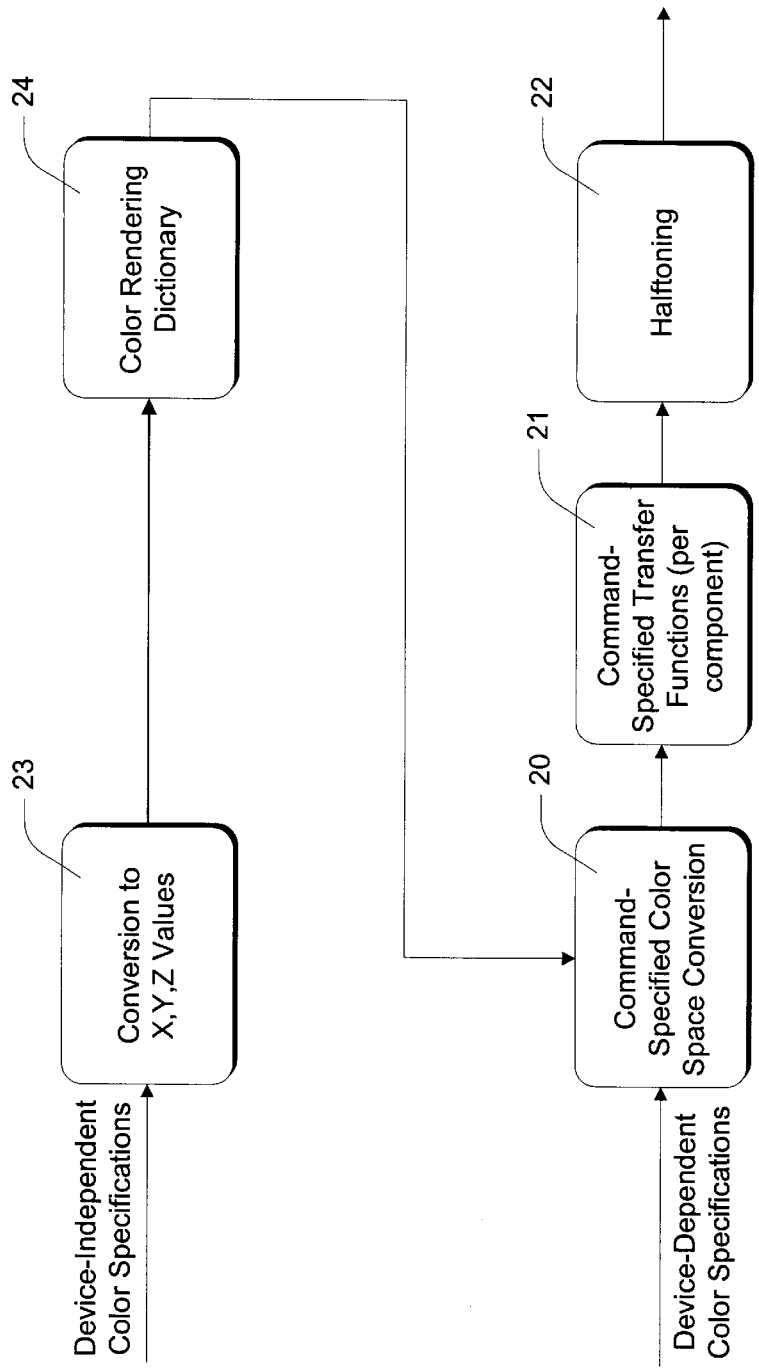
FIG. 1 is a block diagram of color rendering paths in an example of a prior art PostScript language interpreter.

In the embodiment of FIG. 3, the Level 1 pipeline remains unchanged from the standard architecture of FIG. 1. It begins with a command-specified color space conversion function 60 that is optionally applied to incoming device-dependent color specifications. As described above, PostScript language programs can contain commands that request explicit conversions between device-dependent color spaces. Any such requested conversions are performed by color conversion function 60. Function 60 is a standard PostScript feature.

The internal color specifications resulting from color space conversion function 60 are then processed by transfer functions 61 on a component-by-component basis. By default, the transfer functions are unity functions. However, PostScript commands received by printer 50 can specify different transfer functions relative to any of the available device-dependent color spaces.

A halftoning operation 62 is then optionally performed on the color specifications that have now been converted to the internal color working space. By default, halftoning is disabled in this part of the pipeline. However, a PostScript program can specify halftoning though standard PostScript commands. The color specifications are then processed by scan conversion components (not shown).

Printer 50 also includes the PostScript-standard Level 2 converters or conversion components, beginning with a conversion function 65, often referred to as a color space array or CSA, that converts CIE-based or other device-independent color specifications to a base device-independent color space that uses components X, Y, and Z. The CSA performs color conversion in accordance with algorithms and transforms that are dynamically specified by graphics commands during rendering. These device-independent color specifications are then converted to device-dependent color specifications using a standard PostScript color rendering dictionary or CRD 66. The CRD performs color conversion in accordance with algorithms and transforms that are dynamically specified by graphics commands during rendering.

Although these standard Level 2 components are implemented within printer 50, they are not used during actual color rendering and are not part of the actual Level 2 pipeline. Rather, in accordance with the invention they are used only to initialize a hardware-based lookup component 70. During rendering, input color values are initially received by lookup component 70 and converted by lookup component 70 to output color specifications based on values contained in a lookup table 72—thus bypassing the standard PostScript converters of the Level 2 pipeline.

More specifically, lookup component 70 maintains a table with output color values corresponding respectively to selected input color values. In response to receiving an input value during rendering, the lookup component finds a corresponding output value in the table and provides this value to the Level 1 pipeline.

In the described embodiment, table 72 has output values corresponding only to a limited number of input values. Output values corresponding to other input values are obtained by interpolation. The interpolation is performed by acceleration hardware 56, using instructionless logic to provide higher speed that an interpreted instruction implementation.

Table 72 is initialized through the use of the standard Level 2 pipeline components: CSA 65 and CRD 66. Specifically, whenever new algorithms or transforms are specified for the CSA or CRD through PostScript language instructions, the new algorithms or transforms are provided to the CSA and CRD. Then, the input values of table 72 are fed through the CSA and CRD to calculate corresponding output values. These output values are stored in table 72, and used to provide the Level 2 pipeline conversions in place of CSA 65 and CRD 66. Table 72 is reinitialized whenever new algorithms or transforms are specified for the CSA or CRD. Alternatively, lookup component 70 maintains a cache of tables, so that algorithms already used can be accessed without re-initialization. A default lookup table is preferably maintained in non-volatile memory such as ROM. The default lookup table corresponds to default CSA and CRD algorithms. Each lookup table has a number of dimensions corresponding to the dimensionality of the input color space.

Although the example of FIG. 3 shows one implementation of the invention, a lookup component such as that described can be used in a variety of ways, in conjunction with different color conversion components. For example, the lookup component might be configured to replace only CSA 65 or only CRD 66. Alternatively, a separate lookup component might be provided for each of CSA 65 and CRD 66.

Figure 4:
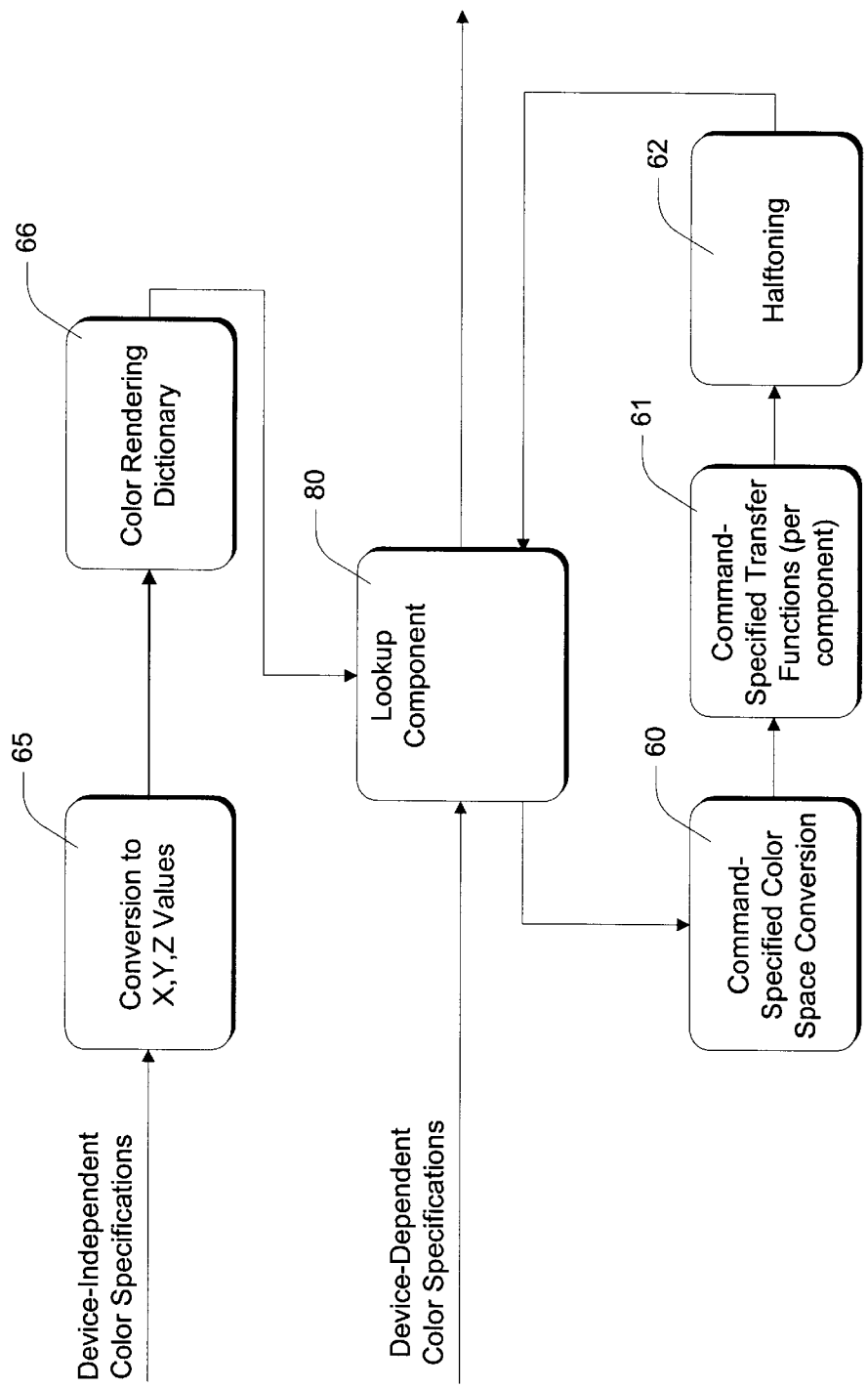
FIG. 4 is a block diagram of color rendering paths in a PostScript language interpreter in accordance with another embodiment of the invention.

FIG. 4 shows another example, where a lookup component 80 is used in conjunction with the components of the Level 1 PostScript pipeline. In this example, device-dependent color specifications are processed by the lookup component rather than by the standard Level 1 components. However, the lookup component is initialized with values calculated by the standard PostScript Level 1 components as described above. In this example, the lookup component bypasses all of the Level 1 conversion components. In alternative embodiments, a lookup component might be configured to bypass less than all of the conversion components, or a different lookup component might be associated with each conversion component.

Figure 5:
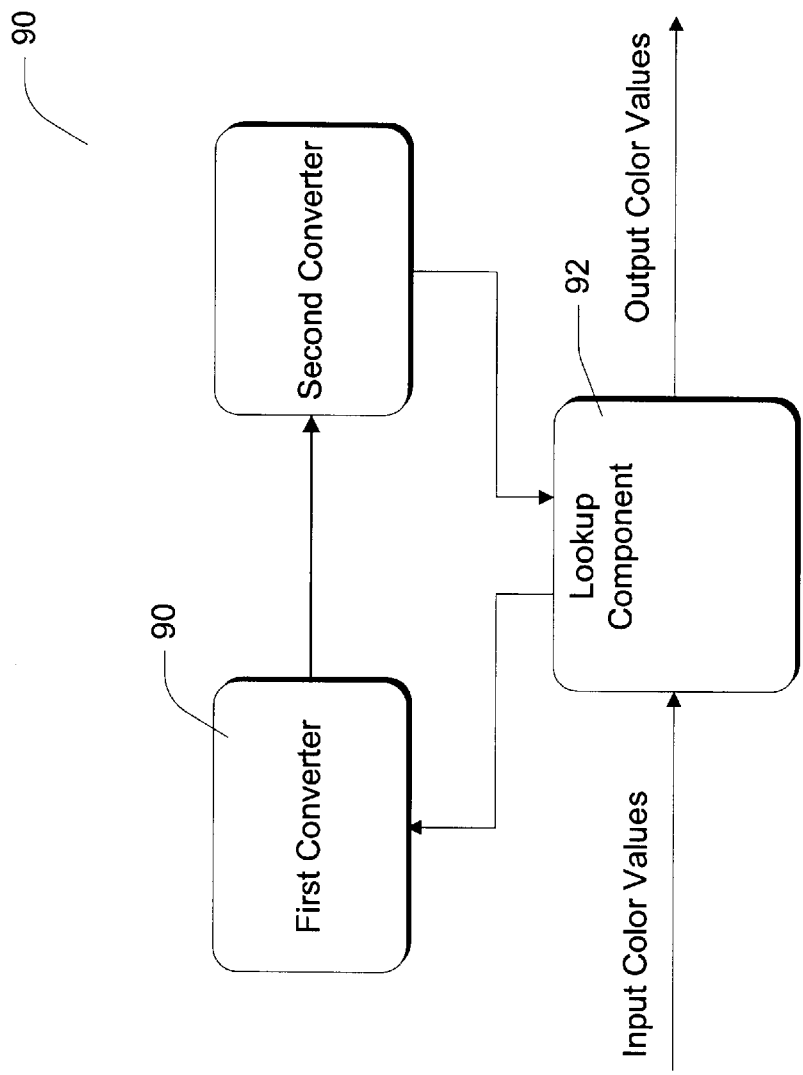
FIG. 5 is a block diagram of a color rendering path in yet another embodiment of the invention.

FIG. 5 shows a more generic implementation of the invention that includes a plurality of color conversion components 90. These color converters are part of a standard color conversion pipeline—such as the PostScript pipelines described above. The color conversion components are implemented by interpreting instructions of a standard graphics language and are therefore somewhat slow. However, actual color conversions, during rendering, are performed by a lookup component 92. The lookup component 92 is initialized as described above, by calculating output values with the actual color conversion components 90.

Although the embodiments described above are implemented in conjunction with PostScript pipeline, lookup tables as described are useful in conjunction with other color rendering systems, such as ICC color rendering systems. In an ICC system, ICC profile-based color conversion components are associated with a lookup component, and the lookup component is initialized by using the ICC-specified conversion components. Actual color conversion, however, is performed by the lookup component.

The use of hardware-based interpolation provides a significant speed improvement. However, use of interpolated lookup tables can provide speed advantages even when interpolation is performed in software. This is particularly the case in ICC systems, in which colors conversions are made using a series of intermediate calculations such as range checking, decoding, and matrix operations.

Although the description above is phrased primarily in terms of the invention's operational and functional components, the invention also includes methodological steps of converting color specifications from input color values to output color values. Such steps include implementing a lookup component in conjunction with a series of one or more color conversion components. Further steps include initializing a lookup table of the lookup component with values calculated by the color conversion components, and thenceforth performing actual color conversions using the lookup component rather than the color conversion components. Further steps include interpolating between output values of the lookup table to derive output values corresponding to input values when such values are not found in the lookup table.

The invention results in a significant improvement in the efficiency of processing device-dependent and device-independent color specifications. Previously, such specifications were processed through the standard PostScript Level 1 and 2 pipelines, which are relatively inefficient due to their use of instruction-based algorithmic conversions. With the invention, however, these inefficient converters are bypassed with more efficient lookup tables. To maintain absolute compatibility with the original PostScript standard, however, the original converters are maintained and used to initialize the lookup tables.

The invention has been described in language specific to structural features and/or methodological steps. It is to be understood, however, that the invention defined in the appended claims is not necessarily limited to the specific features or steps described above. Rather, the specific features and steps are disclosed as exemplary forms of implementing the claimed invention.

What is claimed is:

1. A graphics language interpreter that accepts and interprets graphics commands in accordance with a predefined graphics language, comprising:
   one or more color converters that accept input color values and that convert such input color values to output color values;
   a lookup component associated with said one or more color conversion components, the lookup component indicating output color values corresponding respectively to selected input color values;
   wherein the lookup component is initialized with output color values that are converted from the selected input color values by the one or more color converters;
   wherein the graphics language interpreter uses the lookup component rather than the one or more color converters to convert input color values to output color values.

2. A graphics language interpreter as recited in claim 1, wherein the one or more color converters perform their algorithmic conversions by interpreting graphics commands.

3. A graphics language interpreter as recited in claim 1, wherein:
the graphics language interpreter is a PostScript graphics language interpreter; and
wherein said one or more color converters comprise a PostScript color rendering dictionary.

4. A graphics language interpreter as recited in claim 1, wherein:
the graphics language interpreter is a PostScript graphics language interpreter; and
said one or more color converters comprise a PostScript color space array.

5. A graphics language interpreter as recited in claim 1, wherein:
the graphics language interpreter is a PostScript graphics language interpreter;
said one or more color converters comprise a PostScript color rendering dictionary and a PostScript color space array.

6. A graphics language interpreter as recited in claim 1, wherein:
the graphics language interpreter is a PostScript graphics language interpreter; and
wherein said one or more color converters comprise color conversion components of a PostScript Level 1 pipeline.

7. A graphics language interpreter as recited in claim 1, wherein said one or more color converters comprise one or more ICC profile-based color conversion components.

8. A graphics language interpreter as recited in claim 1, wherein the one or more color converters use color conversion algorithms that are potentially specified by graphics commands in accordance with the predefined graphics language.

9. A graphics language interpreter as recited in claim 1, wherein the one or more color converters use color conversion algorithms that are potentially specified by graphics commands during graphics rendering in accordance with the predefined graphics language, wherein the lookup component is dynamically initialized in response to color conversion algorithms specified by such graphic commands.

10. A graphics language interpreter as recited in claim 1, wherein:
the lookup component indicates only a limited number of output color values; and
the graphic language interpreter interpolates to obtain additional output color values.

11. A graphics language interpreter as recited in claim 1, wherein lookup component comprises a cache that stores output color values corresponding to different color conversion algorithms.

12. A graphics language interpreter as recited in claim 1, further comprising instructionless logic that interpolates between output color values indicated by the lookup component.

13. A graphics language interpreter that accepts and interprets graphics commands in accordance with a predefined graphics language, comprising:
one or more color converters that accept input color values and that algorithmically convert such input color values to output color values, the one or more color converters being specified by a standard that defines the predefined graphics language;
said one or more color converters using color conversion algorithms that are dynamically specified by graphics commands during rendering in accordance with the predefined graphics language;
a lookup component associated with said one or more color converters, the lookup component indicating output color values corresponding respectively to selected input color values;
wherein the lookup component is initialized with output color values that are converted from the selected input color values by the one or more color converters;
wherein the graphics language interpreter uses the lookup component rather than the one or more color converters during rendering to convert input color values to output color values.

14. A graphics language interpreter as recited in claim 13, wherein the one or more color converters perform their algorithmic conversions by interpreting graphics commands.

15. A graphics language interpreter as recited in claim 13, wherein:
the graphics language interpreter is a PostScript graphics language interpreter; and
said one or more color converters comprise a PostScript color rendering dictionary.

16. A graphics language interpreter as recited in claim 13, wherein:
the graphics language interpreter is a PostScript graphics language interpreter; and
said one or more color converters comprise a PostScript color space array.

17. A graphics language interpreter as recited in claim 13, wherein:
the graphics language interpreter is a PostScript graphics language interpreter;
said one or more color converters comprise a PostScript color rendering dictionary and a PostScript color space array.

18. A graphics language interpreter as recited in claim 13, wherein:
the graphics language interpreter is a PostScript graphics language interpreter; and
said one or more color converters comprise color conversion components of a PostScript Level 1 pipeline.

19. A graphics language interpreter as recited in claim 13, wherein said one or more color converters comprise one or more ICC profile-based color conversion components.

20. A graphics language interpreter as recited in claim 13, wherein:
the lookup component indicates only a limited number of output color values; and
the graphic language interpreter interpolates to obtain additional output color values.

21. A graphics language interpreter as recited in claim 13, wherein the lookup component is dynamically initialized in response to color conversion algorithms specified by graphic commands.

22. A graphics language interpreter as recited in claim 13, wherein the lookup component is dynamically initialized in response to color conversion algorithms specified by graphic commands, the lookup component comprising a cache to store lookup tables corresponding to different color conversion algorithms.

23. A graphics language interpreter as recited in claim 13, further comprising instructionless logic that interpolates between output color values indicated by the lookup component.

24. A printer having a PostScript graphics language interpreter that accepts and interprets PostScript graphics commands, the PostScript language interpreter comprising:

a color space array that performs color conversion in accordance with algorithms that are dynamically specified by graphics commands during rendering;

a color rendering dictionary that performs color conversion in accordance with algorithms that are dynamically specified by graphics commands during rendering;

a lookup component that indicates output color values corresponding respectively to selected input color values;

wherein the lookup component is initialized with output color values that are converted from the selected input color values by color space array and the color rendering dictionary;

wherein the PostScript graphics language interpreter uses the lookup component rather than the color space array and color rendering dictionary during rendering to convert input color values to output color values.

25. A PostScript graphics language interpreter as recited in claim 24, the PostScript graphics language interpreter further comprising instructionless logic that interpolates between output color values indicated by the lookup component.

26. A PostScript graphics language interpreter as recited in claim 24, wherein the algorithms of the color rendering dictionary are implemented by interpreting PostScript graphics language commands.

27. A PostScript graphics language interpreter as recited in claim 24, the PostScript graphics language interpreter further comprising:

instructionless logic that interpolates between output color values indicated by the lookup component;

wherein the algorithms of the color space array and the color rendering dictionary are implemented by interpreting PostScript graphics language commands.

28. A PostScript graphics language interpreter as recited in claim 24, wherein the lookup component is dynamically initialized during color rendering in response to color conversion algorithms specified by graphic commands, the lookup component comprising a cache to store lookup tables corresponding to different color conversion algorithms.

\* \* \* \* \*